United States Patent
Thomas

[15] 3,699,367
[45] Oct. 17, 1972

[54] MECHANISM FOR OBTAINING ENERGY FROM TIRE FLEXURE

[72] Inventor: Stephen E. Thomas, 13664 Ronnie Way, Saratoga, Calif. 95070

[22] Filed: Aug. 13, 1971

[21] Appl. No.: 171,545

[52] U.S. Cl.....................................310/69, 310/75
[51] Int. Cl..............................................H02k 7/18
[58] Field of Search.........310/69, 75, 75 C, 75 B, 15, 310/30, 67; 290/1 R

[56] References Cited

UNITED STATES PATENTS

| | | | |
|---|---|---|---|
| 2,160,222 | 5/1939 | McCarty | 310/69 |
| 2,424,700 | 7/1947 | McMath | 310/75 B |
| 2,466,308 | 4/1949 | Fischer | 310/75 B |
| 3,370,220 | 2/1968 | Douglass et al. | 310/69 X |

Primary Examiner—D. F. Duggan
Attorney—John A. Young

[57] ABSTRACT

Located within a flexible vehicle tire is a device which has one portion corotatable with the wheel and a second portion which is reciprocated in a radial sense by the normal flexure of the tire, as the tire moves into ground engagement, is first depressed and then expands to its original condition after moving out of ground engagement. The relative radial movement which occurs between these two portions is utilized to operate an electromagnetic generator.

4 Claims, 8 Drawing Figures

INVENTOR
STEPHEN E. THOMAS
BY John A. Young
ATTORNEY

INVENTOR
STEPHEN E THOMAS
BY John A. Young
ATTORNEY

MECHANISM FOR OBTAINING ENERGY FROM TIRE FLEXURE

BACKGROUND OF THE INVENTION

In my previously filed application entitled "APPARATUS AND PROCESS FOR DEVELOPING ELECTROMAGNETIC ENERGY FROM TIRE FLEXURE", filed July 2, 1971, I disclosed the basic idea of utilizing tire flexure as a source of energy and the many advantages which result from such an arrangement.

It is useful to obtain energy from a heretofore untapped source, i.e., tire flexure, and the electrical energy obtained is susceptible of providing much useful information in the form of conditions of the tire, as for example whether the tire is overinflated, underinflated, overheated, etc. Such information also tells the rate of rotation of the tire and is useful in determining anti-skid operation. By determining the rate of rotation of the respective wheels of the vehicle, it is possible to determine whether the vehicle is in a skid condition or not.

It is a highly valuable discovery to obtain electrical energy from a heretofore overlooked source, namely, the tire flexure. The present invention proposes to achieve the important purposes of the previously filed application in a still further mode which involves tire flexure. In this case the device is based upon a different arrangement of electromagnetic device components and the clutch connection between the electromagnetic device and the mechanism which operates it, namely, one portion attached to the wheel and the other portion attached to the tire, and movable as the tire flexes.

The present invention includes the inherent advantage of being a self-contained unit disposed within a tire in a shielded condition. The power which is generated can produce a signal which is unaffected or relatively unaffected by outer conditions.

OBJECT OF THE INVENTION

It is the principal object of the present invention to provide an improved self-contained unit locatable within a tire which is actuated by the normal flexure of the tire to produce a signal capable of monitoring tire conditions including inflation, temperature, bearing condition and the like.

Another object of the present invention is to provide an improved device which utilizes normal flexure of the tire as a power source for generating electrical energy adapted for a variety of different uses, including but not limited to, illumination, generating RF signals, sonic waves and the like.

It is a general and overall object of the present invention to provide useful energy from previously untapped sources in the manner which is generally described in my copending application filed July 2, 1971.

Other objects and features of the present invention will become apparent from a consideration of the following description which proceeds with reference to the accompanying drawings.

DRAWINGS

SPECIFIC WORKING EXAMPLE

Figure 1:
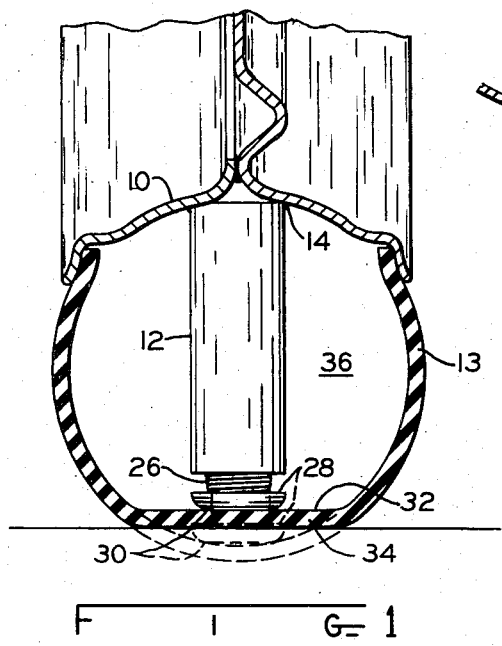
FIG. 1 is a sectional view of an automotive tire which incorporates the present invention therein; the actuator is shown in two positions, the full line position is the one in which it is fully depressed by ground engagement, and the dotted line position illustrates the actuator after the tire section is rotated out of engagement with the ground.
Figure 2:
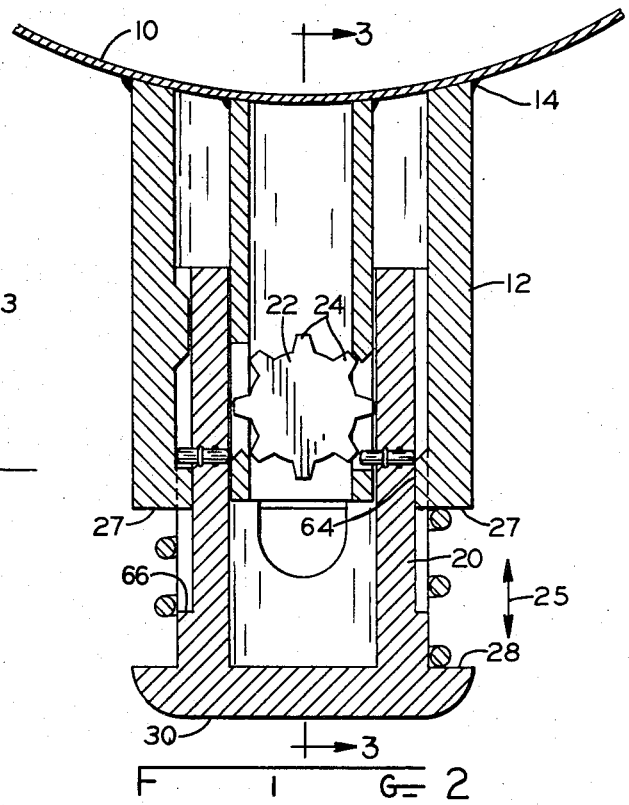
FIG. 2 is an enlarged sectional view of the actuator.

Referring now to the drawings and specifically to FIGS. 1 and 2, there is secured to a wheel 10 a sleeve 12 which is of tubular construction. The sleeve 12 is fastened to the wheel by welding or other mechanical fastening 14. While the sleeve rotates with the wheel 10 it is radially fixed. Mounted for reciprocal movement within the sleeve 12 is a plunger 20 which has a slotted section 21 permitting it to move relatively to a cog wheel 22 having a plurality of regularly spaced cogs 24. Plunger 20 is movable reciprocally in a radial sense as indicated by double arrow headed line 25.

The plunger 20 is held in a normally extended position by means of a spring 26 which is compressed between the end 27 of sleeve 12 and the shoulder 28 of plunger 20. The plunger 20 has a head 30 which engages the interior surface 32 of the tire 10 so that when the tire section associated therewith comes into contact with the ground, it forms a "foot" 34, being thereby radially foreshortened and the head 30 is moved upwardly until its associated section of the tire moves out of ground engagement and is restored to its original shape by the resilience of the tire and inflation pressure within the interior 36.

Figure 4A:
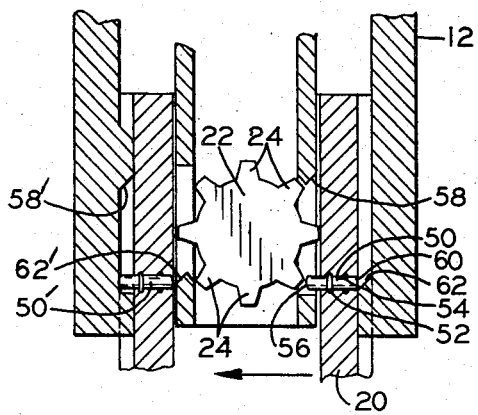
FIGS. 4A-4D are progressive views showing how the actuator powers the generator during both upstroke and downstroke.
Figure 4B:
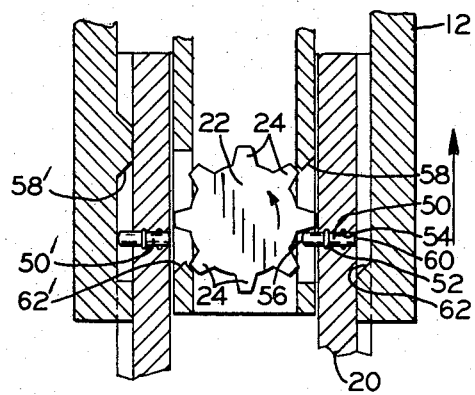
Figure 4C:
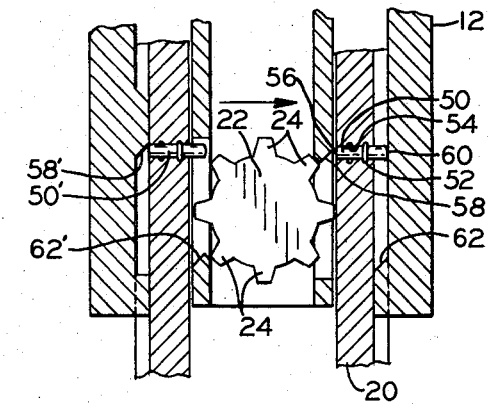

As the plunger 20 moves upwardly (FIG. 4B), a camming pin 50 held by detent 52 within opening 54, engages one of the cogs 24, moving from the position at the right hand side of FIG. 4A, to the position, FIG. 4C. At the upward end of the stroke of the plunger (FIG. 4C), the end 56 of camming pin engages a fixed cam surface 58 thereby forcing the camming pin inwardly.

Figure 4D:
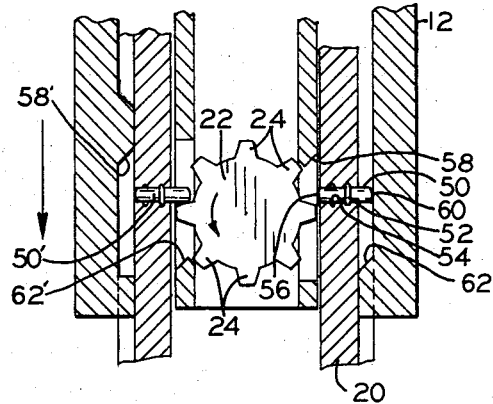

After the plunger 20 has been fully raised it reverses its travel being moved from FIG. 4C to FIG. 4D to FIG. 4A (where the cycle began) by means of a spring 26 as the tire section moves out of engagement with the ground. End 56 of pin 50 moves past cog 24 during the downward stroke until end 62 engages the camming surface 62 in the sleeve 12, thus bringing the end 58 outwardly once again for reengagement with the successive cog 24 during the next upward movement of the plunger 20. During downward stroke, pin 50' actuates the cog wheel since the arrangement of cam surfaces 58' and 62' is reversed whereby pin 50' is extended toward the cog wheel as it moves downwardly (FIG. 4D) and is retracted during upward stroke (FIG. 4B).

The object of this embodiment of the invention is to achieve rotation of the generator cog wheel 22 with a small stroke of the plunger 20. It will be appreciated that the tire rotates with considerable speed and what is required is sufficient propelling force for the generator without entailing a destructive stroke length for the plunger 20. The plunger 20 is guided in a cylindrical bearing surface 64 provided at the end of sleeve 12 and sufficient bearing length is provided to insure linear reciprocal movement as indicated by double arrow headed line 25.

The maximum upward stroke of the plunger is determined by an annular stop 66 formed integrally with the end 30 and engageable against face 27 at the end of sleeve 12.

Figure 3:
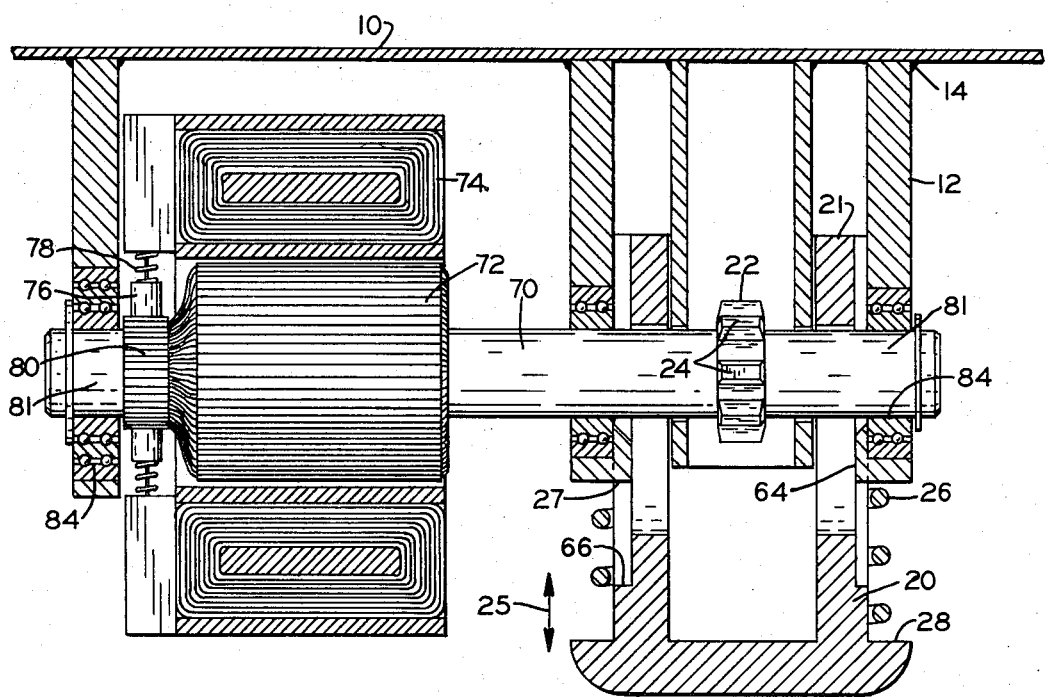
FIG. 3 is a sectional view taken on line 3—3 of FIG. 2.

During each reciprocation of the plunger 20 camming pins 62 move in and out, engaging one of the cogs 24 and imparting a turning effort of the cog wheel 22. As the cog wheel 22 rotates so also is rotated a shaft 70 which is connected to armature 72. The armature 72 cuts lines of force surrounding coil 74 and a series of brushes 76 which are loaded by springs 78 against commutator 80 communicate electrical energy to an electrical circuit for some useful purpose. Ends 81 of the shaft 70 are mounted on anti-friction bearings 84 as indicated in FIG. 3.

Figure 5:
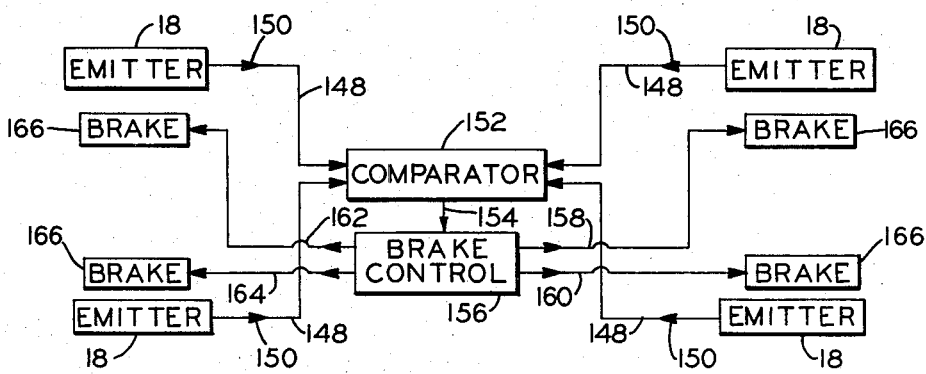
FIG. 5 is a block diagram indicating how the electrically energy derived from the electromagnetic device is used in detecting wheel skid.

Referring next to FIG. 5, each of the devices generate an RF or other signal and are designated emitters 140, 142, 144 and 146 which are associated with each of the vehicle wheels and transmit a signal, which is a measure of the rate of rotation of the associated wheel, through an associated conductor 148 in the direction of the arrow 150 to a comparator 152. The comparator distinguishes which of the wheels is rotating at a slower relative speed and transmits this signal through conductor 154 to a brake control 156, having hydraulic connections 158, 160, 162 and 164 with brakes 166 associated one with each of the wheels of the vehicle. In the event that any one of the wheels associated with the emitter 142 is locked, indicating a skid, then brake applying force is relieved so that the wheel or wheels can resume speed.

Thus, each device can generate a signal which is in accordance not only with tire conditions but also wheel speed.

There is also comprehended within the teaching of the present invention, the use of an output signal of the device to indicate tire conditions and wheel speed, or a combination of both tire signaling and wheel speed to obtain anti-skid control.

OPERATION

In operation each time the tire rotates and the section thereof associated with the end 30 of plunger 20 comes into engagement with the ground, the plunger 20 is depressed because of the tIre coming into a shape of a "foot". As the tire is thereby radially foreshortened, the plunger 20 is moved upwardly and end 56 of cam (FIG. 4B) engages one of the cogs 24 of cog wheel 22 rotating the cog wheel 22 and generating electrical energy from the electromagnetic generator consisting of an armature 72 and surrounding coil 74. Electrical energy is communicated from brushes 76 and commutators 80 to electrical circuits as previously described. As the depressed tire section restores to its original shape, the pin 50 moves past the cog wheel in its downward stroke but has retracted so that it will no rotate the cog wheel. The downward movement is induced by spring 26 and when the plunger reaches its maximum extension, the pin 50 engages face 62 to be extended and thereby available for another operation of the cog wheel. The pin 50' is effective during downward stroke to operate the cog wheel 22 (FIG. 4D).

It thus occurs that torque force is communicated to the cog wheel 22, twice, each rotation of the tire. The rotation of the tire 13 occurs frequently enough, and sufficient energy is involved during each revolution of the wheel or tire to produce considerable impulses of input energy from the periodic flexure of the tire. As it comes first into engagement with the ground, the ground-engaging tire section is distorted into a "foot" and then passes out of engagement with the ground and resumes its circumferential shape.

The electrical energy derived in the manner described, can be interpreted and is also sufficient in output for a number of useful purposes including the operating of running lights to improve the side vision of the vehicle, operating an alarm to signal underinflation of overinflation, or overheating of the tire, and the signal can also be differentiated to indicate excessive deceleration or wheel lock, these being meaningful signals in anti-skid operation.

More than one device can be operated for each tire and the series connection will provide maximum voltage and constant current; or permanent magnets can be used in place of the field coil and the commutators connected in series or the devices can have parallel connections to obtain maximum current and constant voltage.

A signal output is further obtainable from each wheel through an associated emitter, such emitter information being transferred to a comparator which is turn regulates a brake control to the respective brake.

Although the present invention has been illustrated and described in connection with a few selected example embodiments, it will be understood that these are illustrative of the invention and are by no means restrictive thereof. It is reasonably to be expected that those skilled in this art can make numerous revisions and adaptations of the invention, and it is intended that such revisions and adaptations will be included within the scope of the following claims as equivalents of the invention.

What is claimed is:

1. A device for deriving energy from tire flexure comprising a rotatable member operably fixed to a portion of the wheel and in fixed radial position thereon, a coacting plunger movable relatively to said member in a radial direction responsively to tire flexure which occurs as the tire comes into ground contact during each revolution of the tire, resilient means for extending said plunger in an opposite radial direction, driving means disposed within said plunger and adapted for limited transverse movement therein, and a generator having a wheel operatively engageable by said driving means during reciprocable movement of said plunger to effect driving of said generator.

2. An apparatus in accordance with claim 1 wherein said generator is disposed at right angle to the radial movement of said plunger.

3. The structure in accordance with claim 1 wherein said rotatable member is rigidly fixed to the wheel frame by mechanical attachment therewith.

4. Apparatus for generating electrical energy from tire flexure comprising: force transmitting means disposed within the interior of the tire and arranged to move circumferentially therewith, mean displaceable radially responsively to the flexure of the tire during rotation thereof, and coacting with said force transmitting means, a combination of coil-and-magnet also disposed within said tire and located transversely to the radial movement of said radially displaceable means, and means forming a disconnectable driving connection between said radially reciprocal means and said combination coil-an-magnet being thereby effective to convert tire flexure into electrical energy.

* * * * *